Patented June 29, 1954

2,682,547

UNITED STATES PATENT OFFICE 2,682,547

BIS-GLYCIDYL ETHERS OF CHLOROHYDROQUINONES AND PROCESS OF PREPARING THEM

Milton L. Clemens, Harold von Bramer, and De Walt S. Young, Kingsport, Tenn., assignors to Eastman Kodak Company, Rochester, N. Y., a corporation of New Jersey No Drawing. Application October 1, 1952, Serial No. 312,638

8 Claims. (Cl. 260—348)

This invention relates to new compounds, the bis-glycidyl ethers of the chlorine substitution products of hydroquinone, and to a process of making them. The bis-glycidyl ethers of the chlorine substitution products of hydroquinone may be represented by the structural formula:

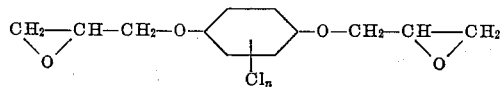

in which $n$ is a whole number from 1 to 4 inclusive. The chlorine atoms or atoms may have any possible position on the benzene nucleus.

While bis-glycidyl ethers of hydroquinone and resorcinol are known, the bis-glycidyl ethers of chlorine-substituted hydroquinone have not hitherto been described. We find that the presence of chlorine attached to the benzene nucleus of hydroquinone decreases the formation of gummy, polymeric materials usually associated with the preparation of glycidyl ethers of polyhydric phenols. In addition, the presence of the chlorine increases the molecular weight and thus decreases the volatility of the bis-glycidyl ether. This is a desirable characteristic when the bis-glycidyl ether is compounded with plastics and the composition is subjected to heat or weathering. The solubility of the chlorohydroquinone bis-glycidyl ethers in commonly used plasticizers, such as the phthalic acid esters, is greater than that of the unsubstituted hydroquinone bis-glycidyl ether. The latter is so insoluble in the common plasticizers that its incorporation into plastics is almost impossible. The solubility of mono-chloro-hydroquinone bis-glycidyl ether, in particular, is such that it can be introduced into cellulose acetate-butyrate or polyvinyl chloride plastics without difficulty. The chlorohydroquinone bis-glycidyl ethers act as stabilizers in cellulose ester and polyvinyl chloride plastic compositions. The melting points or freezing points of the bis-glycidyl ethers of chlorohydroquinones are, in general, lower than those of hydroquinone bis-glycidyl ether, a fact which facilitates handling of the compounds in the liquid state. By varying the number and position of the chlorine atoms in the benzene nucleus, the properties of the bis-glycidyl ether may be varied to fit a a particular need.

According to our invention, a chlorinated hydroquinone is reacted with epichlorohydrin, by heating in the absence of air, in the presence of a basic catalyst and an excess of epichlorohydrin, to yield the corresponding chlorohydroquinone di - (beta - hydroxy - gamma - chloro) - n - propyl ether, according to the following chemical equation:

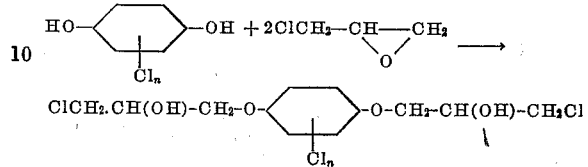

in which $n$ has the meaning defined above.

After the unreacted epichlorohydrin has been distilled off, the chlorohydroquinone di-(beta-hydroxy-gamma-chloro)-n-propyl ether is dissolved in a solvent and dehydrochlorinated by means of aqueous caustic to produce the corresponding chlorohydroquinone bis-glycidyl ether. The solvent is then removed by distillation, preferably under reduced pressure.

By way of illustrating the process of our invention, we give the following examples.

EXAMPLE 1.—MONO - CHLOROHYDROQUINONE-BIS-GLYCIDYL ETHER FROM CHLOROHYDROQUINONE

Step A.—Preparation of chlorohydroquinone di-(beta-hydroxy-gamma-chloro)-n-propyl ether

MATERIALS

| | | |
|---|---|---|
| Chlorohydroquinone, M. P.=105½–107° C | 36.125 gms., 0.25 mol. | |
| Epichlorohydrin | 96.25 gms., 1.0 mol. | |
| Potassium hydroxide | 2.0 gms. | in 5 cc. H₂O |
| Sodium hydrosulfite | 0.25 gms. | |

PROCEDURE

The chlorohydroquinone and epichlorohydrin were charged to a stainless steel reactor, purged with nitrogen for 30 minutes and heated to 60° C. The solution of potassium hydroxide and sodium hydrosulfite in water was also nitrogen purged and added to the reaction mix, which was subsequently heated for 16 hours at 67–70° C. under atmospheric pressure. The unreacted epichlorohydrin was distilled off at reduced pressure. 82.4 gms. of chlorohydroquinone di-(beta-hydroxy-gamma-chloro)-n-propyl ether were obtained.

*Step B.—Conversion of chlorohydroquinone di-(beta-hydroxy-gamma-chloro)-n-propyl ether into chlorohydroquinone bis-glycidyl ether*

MATERIALS

| | |
|---|---|
| Chlorohydroquinone di-(beta-hydroxy-gamma-chloro)-n-propyl ether from Step A. | 82.4 gms. |
| Di-isopropyl ketone | 309 gms. |
| Water | 67 cc. |
| Sodium hydrosulfite | 0.5 gm. |
| Sodium hydroxide | 38 gms. in 77 cc. of water |

PROCEDURE

The product from Step A was dissolved in 309 gms. of di-isopropyl ketone, and 67 cc. of water and 0.5 gm. of sodium hydrosulfite were added. The reaction vessel was purged with nitrogen. Next, 38 gms. of sodium hydroxide were dissolved in 77 cc. of water, nitrogen purged and added quickly to the reaction mix. The temperature was raised to 70° C. with agitation and maintained for one hour. Little or no resin, insoluble in the reaction medium was observed. The isopropyl ketone layer containing the product was water washed and the solvent was removed under vacuum.

Weight of chlorohydroquinine - bis - glycidyl ether = 62.2 gms. Theoretical weight = 64.1.

Percent epoxy oxygen = 11.40. Theoretical epoxy oxygen = 12.45.

Percent yield of crude $$= \frac{62.2 \times 100}{64.1} = 97.0$$

Percent yield of available epoxy oxygen $$= \frac{62.2 \times .1140}{64.1 \times .1245} \times 100 = 88.5$$

Freezing point = 56.5° C.

EXAMPLE 2.—MONO-CHLORO HYDROQUINONE-BIS-GLYCIDYL ETHER FROM CHLOROHYDROQUINONE

*Step A.—Preparation of chlorohydroquinone di-(beta-hydroxy-gamma-chloro)-n-propyl ether*

MATERIALS

| | |
|---|---|
| Chlorohydroquinone | 72.25 gms. |
| Epichlorohydrin | 370 gms. |
| Catalyst | 4 gms. of potassium hydroxide in 10 cc. of H₂O. |

PROCEDURE

The chlorohydroquinone and epichlorohydrin were mixed and heated under reduced pressure such that the mixture was refluxed gently at approximately 50° C. The catalyst solution was introduced in a few minutes. After the introduction of the catalyst the mixture was maintained under reflux at 50° C. for 22 hours. The unreacted epichlorohydrin was removed by vacuum distillation. The weight of product to be used directly in Step B was 163.4 gms.

*Step B.—Conversion of chlorohydroquinone di-(beta-hydroxy-gamma-chloro)-n-propyl ether into chlorohydroquinone bis-glycidyl ether*

MATERIALS

| | |
|---|---|
| Entire product from Step A. | 163.4 gms. |
| Benzene | 300 cc. |
| NaOH | 78 gms. in 300 cc. of water. |
| Nitrogen | To maintain inert atmosphere. |
| Water | 150 cc. |

PROCEDURE

The product from Step A was mixed with 300 cc. of benzene and 150 cc. of water. With agitation and nitrogen purging, a cooled, nitrogen purged solution of 78 gms. of sodium hydroxide in 300 cc. of water was added and the batch was stirred for two hours at 38–42° C. The product, which consisted substantially of chlorohydroquinone bis-glycidyl ether, was isolated by benzene extraction followed by solvent evaporation.

Weight = 118.5 gms. Per cent epoxy oxygen = 11.35.

EXAMPLE 3. — MONOCHLOROHYDROQUINONE BIS-GLYCIDYL ETHER FROM CHLORINATED HYDROQUINONE

*Step A.—Chlorination of hydroquinone*

MATERIALS

| | | |
|---|---|---|
| Hydroquinone | gms | 110 |
| Acetic acid | cc | 110 |
| Chlorine | gms | 70.0 |
| Water | cc | 30 |

PROCEDURE

The hydroquinone, acetic acid and water were mixed, and 70 gms. of chlorine was passed in while maintaining the reaction temperature between 90 and 100° C. The hydrogen chloride formed simultaneously with chlorination of the aromatic nucleus was vented, and the solvent was removed to leave behind a residue weighing 148 gms. This residual material consisted substantially of mono-chlorohydroquinone mixed with relatively small quantities of unreacted hydroquinone as well as poly-chlorinated hydroquinones. By reaction as described in Steps B and C below it was possible to convert this crude reaction product into a useful stabilizer for plastics and synthetic resins.

*Step B.—Catalytic condensation with epichlorohydrin*

MATERIALS

| | |
|---|---|
| Crude chlorohydroquinone from Step A. | 72.25 gms. |
| Epichlorohydrin | 370 gms. |
| Potassium hydroxide | 4 gms. in 10 cc. of H₂O |

PROCEDURE

The procedure used was that described under Step A in Example 2. Weight of product after solvent removal = 163 gms.

*Step C.—Dehydrochlorination*

MATERIALS

| | |
|---|---|
| Entire product from Step B. | 163 gms. |
| Benzene | 300 cc. |
| NaOH | 78 gms. in 300 cc. water. |
| Nitrogen | To maintain inert atmosphere. |
| Water | 150 cc. |

PROCEDURE

The procedure used was that described in Step B, Example 2 except that the final benzene extract was filtered from a small quantity of resinous material before solvent removal.

Weight of product = 112.7 gms. Per cent epoxy oxygen = 11.16.

EXAMPLE 4. — 2,5-DICHLORO-HYDROQUINONE-BIS-GLYCIDYL ETHER

*Step A.—Preparation of 2,5-dichloro-hydroquinone-di-(beta-hydroxy-gamma-chloro)-n-propyl ether*

MATERIALS

| | |
|---|---|
| 2,5-dichloro-hydroquinone. | 89.5 gms. |
| Epichlorohydrin | 370 gms. |
| Potassium hydroxide | 4 gms. in 10 cc. of water. |

PROCEDURE

The procedure used was that described in Step A, Example 2 except that the reaction temperature was maintained between 50 and 60° C. The weight of reaction product was 182.5 gms.

*Step B.—Conversion of 2,5-dichloro-hydroquinone-di-(beta-hydroxy-gamma-chloro)-n-propyl ether into 2,5-dichloro-hydroquinone bis-glycidyl ether*

MATERIALS

Entire product from Step A. — 182.5 gms.
Benzene — 300 cc.
NaOH — 78 gms. in 300 cc. water.
Nitrogen — To maintain an inert atmosphere.
Water — 150 cc.

PROCEDURE

The procedure used was that described in Step C, Example 3 except that the reaction time was extended to 6 hours.

Weight of product =131.3 gms. Per cent epoxy oxygen=9.58. Freezing point=131° C.

EXAMPLE 5. — 2,6-DICHLORO-HYDROQUINONE-BIS-GLYCIDYL ETHER

*Step A.—Preparation of 2,6-dichloro-hydroquinone-di-(beta-hydroxy-gamma-chloro)-n-propyl ether*

MATERIALS 2,6-dichloro-hydroquinone. — 25.7 gms.
Epichlorohydrin — 106 gms.
Potassium hydroxide. — 1.15 gms. in 2.9 cc. of water.

PROCEDURE

The procedure used was that described in Step A, Example 2 except that the reaction temperature was maintained at 50–60° C. Weight of crude 2,6-dichloro-hydroquinone-di-(beta-hydroxy-gamma-chloro)-n-propyl ether=53.4 gms.

*Step B.—Conversion of product from Step A into 2,6-dichloro-hydroquinone-bis-glycidyl ether*

MATERIALS

Entire product from Step A. — 53.4 gms.
Benzene — 87 cc.
Water — 43 cc.
Sodium hydroxide. — 22.4 gms. in 87 cc. of water.
Nitrogen — To maintain inert atmosphere.

PROCEDURE

The reaction product from Step A was slurried with 87 cc. of benzene and 43 cc. of water. The solution of sodium hydroxide in water was purged with nitrogen and added to the benzene-water slurry, which was also provided with an inert nitrogen atmosphere. After heating with agitation at 40° C. for 2 hours, the product was extracted with hot benzene. The benzene extract was filtered to remove any insoluble material and after solvent removal 40.5 gms. of crude 2,6-dichloro-hydroquinone bis-glycidyl ether was isolated.

Per cent epoxy oxygen=9.95. Freezing point=38° C.

Many variations may be made in the conditions under which the processes of our invention are carried out. In the catalytic reaction of the chlorohydroquinones with epichlorohydrin, although we prefer to conduct the condensation at 50° C. to 70° C., the reaction will proceed satisfactorily at temperatures from room temperature to 117° C., the boiling point of epichlorohydrin, or possibly even higher in case pressures above atmospheric pressure are used. While we prefer to use reduced pressure in this stage of the process, atmospheric or even super-atmospheric pressure may be used with reasonably satisfactory results. The time required to obtain complete reaction will vary with the temperature and the catalyst used. No time limits have been established other than that, as noted in the examples, the condensation appears to be substantially complete within 22 hours when the reaction temperature is 50–70° C., when potassium hydroxide is used as catalyst. Since a relatively small but still significant proportion of the original epichlorohydrin is converted into alpha-glycerol-dichlorohydrin, it is evident that more than two mols of epichlorohydrin are required per mol of chlorohydroquinone for complete conversion. On the other hand, any desired excess of epichlorohydrin may be used. The quantities of catalyst used in the examples are sufficient to effect the reaction, and probably constitute an excess.

Although, as illustrated in the examples, we prefer to conduct the dehydrochlorination step at approximately 40° C., the reaction might be effected more or less satisfactorily at any temperature from room temperature to the reflux temperature of the aqueous solutions. In all of the experiments which we have conducted, the dehydrochlorination was complete within two hours. The quantities of solvents used are not critical. An excess of sodium hydroxide improves the dehydrochlorination. This is a point in marked contrast to prior work on phenolic glycidyl ethers.

Any possible chlorohydroquinone, or mixtures of chlorinated hydroquinones, may be used as starting material. Considerable modification is possible in the selection of a catalyst for the condensation between the chlorinated hydroquinone and epichlorohydrin. In general, almost any alkaline acting material might be expected to give satisfactory results.

Various solvents may be used in the dehydrochlorination step. More or less satisfactory results have been obtained with benzene, methyl ethyl ketone, di-isopropyl ketone, diethyl ketone, methyl isopropyl ketone, and di-isopropyl ether.

The technique of conducting the condensation step under reduced pressure at reflux is an important modification in reactions concerning hydroquinone derivatives, which are especially susceptible to oxidation and color formation.

It is to be expected that since the chlorohydroquinone bis-glycidyl ethers contain two asymmetric carbon atoms, they will consist of mixtures of stereoisomers.

What we claim as our invention and desire to be secured by Letters Patent of the United States is:

1. The bis-glycidyl ethers of chlorohydroquinones, having the structural formula

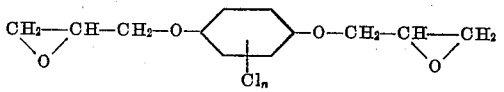

in which $n$ is a whole number from 1 to 4 inclusive.

2. The bis-glycidyl ether of mono-chlorohydroquinone.

3. The bis-glycidyl ether of 2,5-dichlorohydroquinone.

4. The bis-glycidyl ether of 2,6-dichlorohydroquinone.

5. A process of preparing the bis-glycidyl ether of a chlorohydroquinone having the structural formula

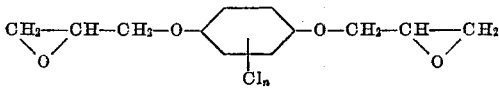

$n$ being a whole number from 1 to 4 inclusive, which consists essentially in heating the corresponding chlorohydroquinone with an excess of epichlorohydrin in the absence of air and in the presence of a basic catalyst, distilling off the unreacted epichlorohydrin, dissolving the intermediate product in a solvent, dehydrochlorinating the intermediate product by treating with aqueous caustic, and distilling off the solvent.

6. A process of preparing the bis-glycidyl ether of a chlorohydroquinone having the structural formula

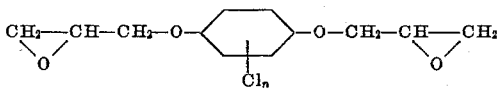

$n$ being a whole number from 1 to 4 inclusive, which consists essentially in heating the corresponding chlorohydroquinone with an excess of epichlorohydrin in the absence of air and in the presence of potassium hydroxide as a catalyst, distilling off the unreacted epichlorohydrin, dissolving the intermediate product in a solvent, dehydrochlorinating the intermediate product by treating with aqueous caustic, and distilling off the solvent.

7. A process of preparing the bis-glycidyl ether of a chlorohydroquinone having the structural formula

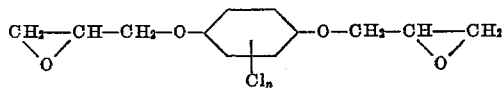

$n$ being a whole number from 1 to 4 inclusive, which consists essentially in heating the corresponding chlorohydroquinone at 50°–70° C. with an excess of epichlorohydrin in the absence of air and in the presence of potassium hydroxide as a catalyst, distilling off the unreacted epichlorohydrin, dissolving the intermediate product in a solvent, dehydrochlorinating the intermediate product by treating with aqueous caustic, and distilling off the solvent.

8. A process of preparing the bis-glycidyl ether of a chlorohydroquinone having the structural formula

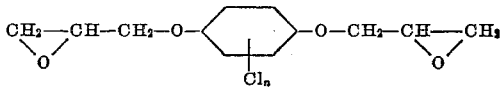

$n$ being a whole number from 1 to 4 inclusive, which consists essentially in heating the corresponding chlorohydroquinone under reduced pressure at 50°–70° C. with an excess of epichlorohydrin in the absence of air and in the presence of potassium hydroxide as a catalyst, distilling off the unreacted epichlorohydrin, dissolving the intermediate product in a solvent, dehydrochlorinating the intermediate product by treating with aqueous caustic, and distilling off the solvent.

No references cited.